Oct. 27, 1931.  C. B. DE HART  1,828,861
HYDRAULIC CLUTCH
Filed March 29, 1930  2 Sheets-Sheet 1

Fig.1

Witness:
Chas. R. Kourah.

Inventor:
Charles B. De Hart
Benj. J. Brookhouse, Atty.

Oct. 27, 1931.  C. B. DE HART  1,828,861
HYDRAULIC CLUTCH
Filed March 29, 1930  2 Sheets-Sheet 2
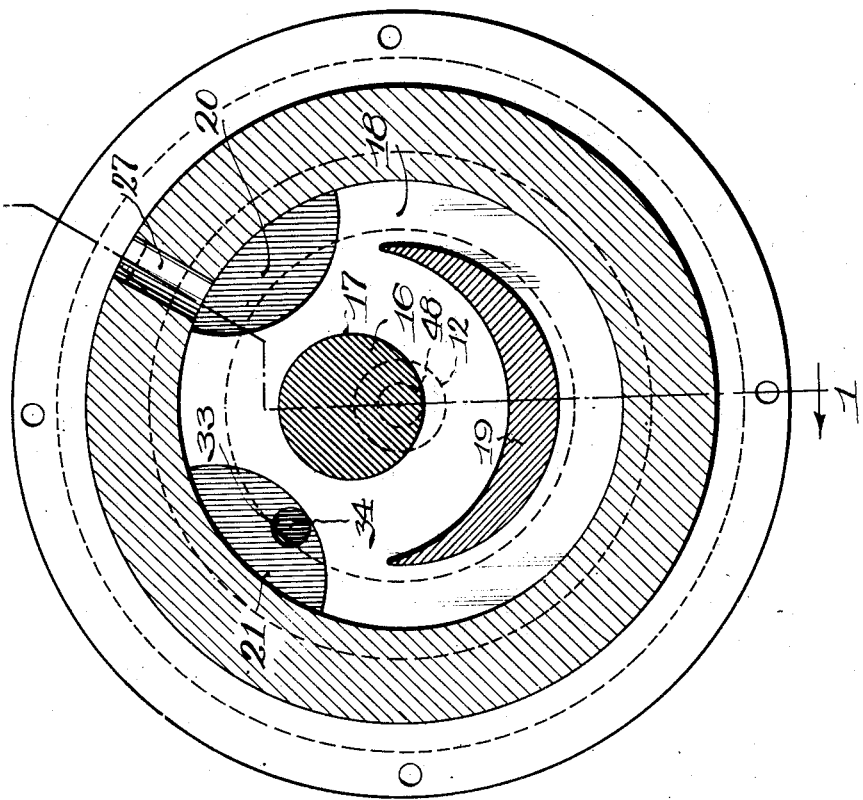
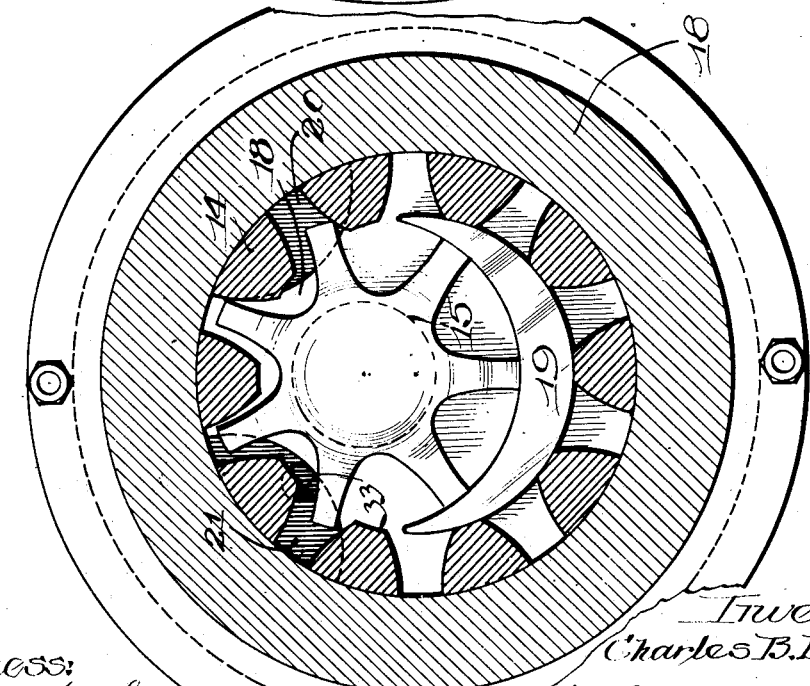

Patented Oct. 27, 1931

1,828,861

UNITED STATES PATENT OFFICE

CHARLES B. DE HART, OF CHICAGO, ILLINOIS, ASSIGNOR OF ONE-HALF TO CHARLES W. DE HART, OF CHICAGO, ILLINOIS

HYDRAULIC CLUTCH

Application filed March 29, 1930. Serial No. 439,907.

My present invention has relation to the provision of an hydraulic clutch or an organization of instrumentalities for connecting and disconnecting a drive shaft, which is being rotated by some suitable prime mover, with and from a driven shaft, whereby the movement when connection is initially made will be gradually imparted to the driven shaft, thereby eliminating impact upon coupling.

As will hereafter be seen my invention secures a gradual and effective coupling of the drive and driven shafts, and requires extremely simple manual operation for both connecting and disconnecting the clutch.

I have attained the foregoing objects and results by means of the mechanism illustrated in the accompanying drawings, in which—

Fig. 1 is a section through a clutch embodying my invention on line 1—1 of Fig. 3;

Fig. 2 is a section on line 2—2 of Fig. 1 looking in the direction of the arrows; and Fig. 3 is a section on line 3—3 of Fig. 1 looking in the direction of the arrows.

Similar reference characters refer to similar parts throughout the several views.

The main clutch housing consists of two housing members, 5 and 6, which meet at approximately the center of the structure and are secured together by bolts 7. The end of the housing member 5 is centrally apertured and somewhat thickened and extended, as at 8, to form a support for the structure at one end and also to carry the journals and packing for the drive shaft 9. The corresponding supporting extensions 10 are produced from the housing member 6 somewhat before the end of the casing is reached, but the end of the member 6, as at 11, is thickened and centrally apertured for receiving and supporting the packing and journal for the driven shaft 12.

I employ in my clutch a gear pump which may be of any suitable design, as the specific design of the gear pump employed is no part of my present invention. In the drawings I have illustrated a typical form of gear pump suitable for employment in connection with my clutch. Such a gear pump consists of a disc 13 either made integral with or attached to the inner end of the drive shaft 9. The disc 13 has provided upon the face opposite to that attached to the drive shaft 9 an internal gear 14, the teeth whereof mesh consecutively with the teeth of a star wheel 15 disposed eccentrically with respect to the disc 13. The hub 16 of the star wheel rotates in a bore 17 provided in a block 18, which constitutes a part of and an end closure for the gear pump housing. The block 18 has extending from the face thereof a lune-shaped projection 19 a little thicker than the star wheel 15, the inner edge whereof is of the same radius as the star wheel. The block 18 has a recess 20 located upon one side of the point of greatest mesh between the star wheel 15 and gear 14 and a recess 21 located on the opposite side of the point of greatest mesh from the recess 20. The disc 13, gear 14 and part of the block 18 are mounted in a housing 22, a tubular extension of which also encloses a length of the drive shaft 9. The housing 22 and block 18 are enclosed in a casing formed of two parts, 23 and 24, secured together at their meeting edges by bolts 25. The part 23 is provided with a tubular extension 26 extending through and beyond the end wall 8 of the casing member 5, and the part 24 has secured thereto or integral therewith the driven shaft 12 of the clutch.

Provided in the housing member 22 is an entrance port or chamber 27 communicating with recess 20 in the block 18; and, provided between the housing member 22 and the casing member 23, there is a channel 28 leading from the entrance port or chamber 27 to the end of the tubular extension of the housing member 22. Channel 28 communicates with an annular chamber 29 formed by the drive shaft 9 and the tubular extension 26 of the casing member 23. The outer end of the chamber 29 is closed by an annular bushing 30 surrounding the drive shaft 9 and screwing into the tapped end of the tubular extension 26. The inner face of the annular bushing 30 is obliquely beveled towards its axis and the chamber 29 is packed with respect to the annular bushing 30 by means of the packing ring 31 yieldingly held in position by coil spring 32 extending between the packing ring 31 and the end of the tubular extension of the housing 22.

The recess 21 in the block 18 communicates by means of a bore 33 in the block 18 with a disc-like cavity 34 formed in the casing member 24 just exterior of the block 18.

To form a journal and packing for the tubular extension 26 of the casing member 23 I provide the flanged collar 35 which is secured to the end aperture of the thickened end plate 8 of the casing member 5 by means of nut 36. From the central portion of the collar 35 is developed an annular, inwardly extending rectangular shoulder 37, which forms a bearing for the tubular extension 26 of the inner casing member 23. In the inner cylindrical face of the shoulder 37 is an annular channel 38 which communicates by means of perforations 39 in the annular extension 26 with the chamber 29 heretofore referred to, and from the annular channel 38 passageway 40 is provided in the collar 35, which communicates with passageway 41 in the thickened end wall 8 of the casing member 5 leading to a point interior of and adjacent the bottom of the casing formed by members 5 and 6. The collar 35 is packed against the escape of any fluid which may work out between the tubular extension 26 and the shoulder 37 by means of collar caps 42 and 43 which surround the tubular extension 26 and screw upon the ends of the flanged collar 35. The inner end faces of the collar caps 42 and 43 are formed to provide an oblique bearing edge co-operating with oppositely beveled packing rings 44 and 45 which are respectively held yieldingly in place by coil springs 46 and 47 extending between the respective packing rings and opposite faces of the shoulder 37.

Packing and bearing means are provided for driven shaft 12 in all respects similar to packing and bearing means provided for the drive shaft 9, which respective parts I have indicated by the same reference characters except that I have appended the letter "a" to each reference character referring to the packing and bearing parts for the driven shaft 12. With the driven shaft 12, however, which is attached to or made integral with the casing member 24, there is no tubular extension 26, and the packing and bearing parts co-operate directly with the driven shaft.

The driven shaft 12 is axially bored from its inner end providing a channel 48 extending from the disc-shaped recess 34 to or slightly beyond the annular channel 38a and cross bores 49 are provided between the channel 48 and the anular channel 38a. Channel 40a in collar 35a establishes communication between annular channel 38a and channel 41a in the thickened end 11 of the casing member 6, but unlike channel 41, which emerges within the casing formed by members 5 and 6, channel 41a connects with a loop of tubing 50 exterior of the casing, which loop has included therein a manually operated valve 51 and which loop is turned backwardly and re-enters the casing 6 at a point adjacent the bottom thereof.

Semi-spherical, centrally perforated, end caps 52 and 53 are bolted respectively to the thickened end plates 8 and 11 of the housing members 5 and 6. In the central perforations of the end caps 52 and 53 are secured rings 54 provided with parallel ball races 55, and collars 56 are secured respectively to the drive shaft 9 and driven shaft 12 provided with parallel ball races 57. Co-operating with the ball races 55 and 57 are balls 58 constituting ball bearings for steadying the action and taking any slight end thrust which might develop in connection with drive shaft 9 and driven shaft 12.

The operation of my clutch is as follows: The drive shaft, being rotated by any desired prime mover, rotates the disc 13 carrying the internal gear 14. The teeth of the gear 14 and the teeth of the star wheel 15 partially meshing with the teeth of the gear 14 sweeping by the recess 20 receive therethrough any fluid, such as oil, present, which is carried by the rotation of the disc 13, gear 14 and star wheel 15 on both sides of the lune-shaped projection 19 until the fluid is opposite the recess 21, when a considerable portion thereof will be forced into the recess 21 through the meshing of the internal gear 14 with the star wheel 15.

In proportion to the size of the structure a surprising amount of fluid will be moved as above described, and, if the flow of fluid is checked, pressure will be built up very rapidly until it reaches a point at which the disc 13 and star wheel 15 are prevented from further rotation with respect to the block 18 and casing member 22.

By the rotation of the disc 13 and star wheel 15, as heretofore described, fluid is drawn through the entrance port 27, channel 28, annular chamber 29, bores 39 in tubular extension 26, annular channel 38, passageways 40 and 41 from the bottom of the housing comprising the members 5 and 6. The fluid thus drawn flows from recess 21 through bore 33 to the disc-shaped cavity 34 and from thence through channel 48 and bores 49 in the driven shaft 12 to annular channel 38a and from thence through channels 40a, 41a, tubing 50 and control valve 51 back into the bottom of the housing formed of housing members 5 and 6. So long as control valve 51 is open, disc 13 will rotate freely with respect to its associated parts and the circulation maintained as above described. As soon, however, as control valve 51 is closed, pressure will be built up to a point where the rotation of disc 13 will carry with it block 18 and casing member 22, as well as the casing comprising the members 23 and 24, to the member 24 to which is secured driven shaft 12, thereby imparting the movement of drive shaft 9 to driven shaft 12. While there is little or no compressibility of any fluid which may be employed in connection with my apparatus, the building up of pressure in the system is sufficiently gradual to secure an easy coupling of the shafts which may be further accentuated by such leakage as may be adjustably secured through the manipulation of the control valve 51.

Having described my invention what I claim as new and desire to secure by Letters Patent is:

1. An hydraulic coupling, comprising a drive and a driven shaft, a disc fixed to said drive shaft, a casing surrounding said disc and permitting the rotation of said disc therein, means associated with said disc within said casing for securing a flow of fluid, a second rotatably mounted casing to which the driven shaft is secured within which said first mentioned casing is mounted, said casings having provided therebetween channels for the supply and discharge of fluid to and from said flow producing elements, and means included in said discharge channel for controlling the flow therethrough.

2. An hydraulic coupling, comprising a drive and a driven shaft, a disc fixed to said drive shaft, a casing surrounding said disc and permitting the rotation of said disc therein, means associated with said disc within said casing for securing a flow of fluid, a second rotatably mounted casing to which the driven shaft is secured within which said first mentioned casing is mounted, said casings having provided therebetween channels for the supply and discharge of fluid to and from said flow producing elements, means included in said discharge channel for controlling the flow therethrough and a housing within which said shafts are journaled and from and to which said channels lead.

CHARLES B. DE HART.